United States Patent [19]

Maier

[11] 3,743,765

[45] July 3, 1973

[54] REDUNDANT AREA CODING SYSTEM

[75] Inventor: James J. Maier, Utica, N.Y.

[73] Assignee: The United States of America as represented by the Secretary of the Air Force

[22] Filed: May 26, 1971

[21] Appl. No.: 147,094

[52] U.S. Cl. .............................. 178/6.8, 178/DIG. 3
[51] Int. Cl. .............................................. H04n 7/12
[58] Field of Search .......................... 178/DIG. 3, 6.8

[56] References Cited

UNITED STATES PATENTS 3,618,035 11/1971 Simms, Jr. ........................ 178/6.8 X
3,483,317 12/1969 De Groat ........................ 178/DIG. 3

*Primary Examiner*—Howard W. Britton
*Attorney*—Harry A. Herbert, Jr. and William Stepanishen

[57] ABSTRACT

An apparatus for selecting areas of a film which are of no interest to a user, coding these unimportant areas for identification purposes and selecting the important areas to be translated into useable information. The important information and a code for the unimportant information is transmitted to a user facility, thereby decreasing the information transmitted to the user and conserving the bandwidth required for transmission.

1 Claim, 2 Drawing Figures

INVENTOR.
JAMES J. MAIER
BY Harry A. Herbert Jr
and
William Stepanishen
ATTORNEYS

REDUNDANT AREA CODING SYSTEM

BACKGROUND OF THE INVENTION

The present invention relates broadly to a redundant area coding system and in particular to a coding system for distinguishing areas of a film which may contain important useable information to a user.

In the prior art it is well known that the difference between the limiting frequencies of a frequency band containing the useful component of a signal is called bandwidth. Every communication system requires some optimum bandwidth for the satisfactory transmission of intelligence. Electrical communication systems involve the variation of some electrical quantity as a representation of the signal to be transmitted. Information or intelligence is collected from an originating source and transformed into electric currents or fields. These electric currents or fields are transmitted over electrical networks or through space to another point and recon-verted into a form suitable for interpretation by an user at the receiver. A flow of information from a source occurs when information causes changes which are more or less continuous. A flow of information for a particular time interval constitutes a message. In general, messages must go through a transformation or coding process to translate it into a useable signal which can be transmitted over a communication channel.

In the prior art, however, there has been an inherent problem regarding the transmission of messages containing information. The problem resolves itself to the fact that along with the useable or important information in a transmitted message, a certain amount of unimportant data is also included. It is this inclusion of useless or unimportant information that creates the problem due to the longer time which is required to transmit these large quantities of data. Further, the requirement to transmit large quantities of data impose a need to utilize wide bandwidth in the communication system. The present invention provides a solution to the prior art problem by providing a system of selection and coding of information that permits the use of substantially shorter transmission times and smaller bandwidths.

SUMMARY OF THE INVENTION

The present invention provides a redundant area coding apparatus for selecting areas in acquired data that have very little consequence to a potential user and to identify the superfluous areas by the superposition of a unique code. Thus, the useable information and the coded information which represents the unimportant data may be transmitted in a single message thereby decreasing the number of bits of information that are required to be transmitted. The redundant area coding system, rather than transmit a large bit package which includes data bits that represent useless information, provides a selection by X—Y coordinates of useless information areas and a transmission of an abbreviated digitized code. This system allows an increase in transmission efficiency and a decrease in bandwidth requirements.

It is one object of the invention, therefore, to provide a redundant area coding apparatus capable of selectively coding areas of unimportant information for identification purposes.

It is another object of the invention to provide a redundant area coding apparatus having the capability of information selection between information which is useable and that wbich is not.

It is yet another object of the invention to provide a redundant area coding apparatus to transmit useable information in conjunction with an abbreviated digitized code which represents the unimportant information.

It is a further object of the invention to provide a redudant area coding apparatus having increased transmission efficiency and decreased bandwidth requirements.

These and other advantages, features and objects of the invention will become more apparent from the following description taken in connection with the illustrative embodiment in the accompanying drawings.

DESCRIPTION OF PREFERRED EMBODIMENT

Figure 1:
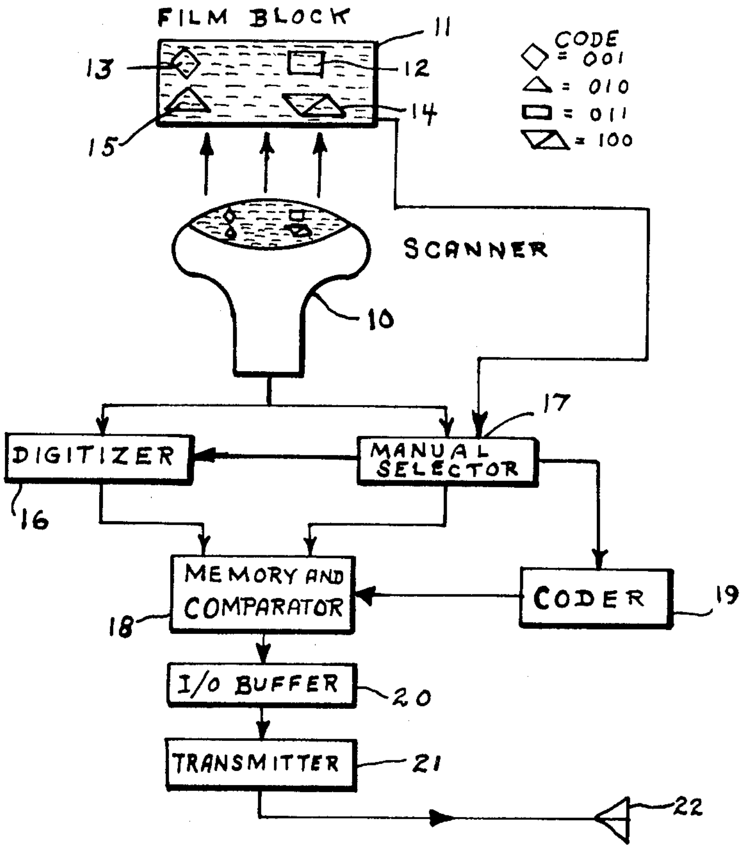
FIG. 1 is a block diagram of the scanner-transmitter group which is utilized in the redundant area coding apparatus.

Referring now to FIG. 1, there is shown the scanner-transmitter group of the redundant area coding apparatus utilizing a scanner unit 10 to scan film block 11. The film block 11 contains unwanted areas, 12–15. The output signal from the scanner 10 is applied to a digitizer unit 16 and a manual selector unit 17. A memory and comparator unit 18 receives output signals from both the digitizer unit 16 and the manual selector unit 17. The manual selector unit 17 also provides signals to the digitizer unit 16 and a coder unit 19. The coder unit 19 supplies an input signal to the memory and comparator unit 18. A code, such as the one that is illustrated in FIG. 1 may be utilized to represent the unwanted areas. Thus, transmission of the details on the film block 11. The output of the memory and comparator unit 18 which contains the entire picture of film block 11 in digital form is applied to transmitter 21 through the input-output buffer 20. The coded output is then transmitted to a user facility by means of antenna 22.

The scanner 10 which is utilized to scan the film block 11 may be a vidicon, cathode ray tube (CRT), laser, or some other similar device which is slaved to a light table with X—Y plotting capabilities. By this means, the scanner 10 is capable of putting into memory theX the X Y coordinates of the areas of the film that are selected manually. Thus, the scanning device 10 will be used to scan the film and to put the entire picture in digital form into the memory 18. The storage in memory may either be done on a line by line basis, with information flowing line by line into the buffer for transmission, or be done on an entire picture basis. The film 11 may be scanned by either a digital device or an analog device and converted into digital information. Once all the digitized information is put into memory, an operator at the manual selector station 17 either selects the areas prior to insertion into memory or after. In either case, the areas are then coded for either deletion or reduction. The manual selector unit 17 may be either a console or a light table with two scanners. The unwanted areas 11–15 which are shown in FIG. 1 may represent vast redundant areas, such as a forest, a desert, swamp area or water, etc. Thus, a code may be utilized to represent these redundant areas for transmission. After the code is inserted into the memory, it is compared and added to the non-redundant data in the memory and comparator unit 18. The digitized data is transferred to the buffer 20 for temporary storage prior to transmittal to a user.

Figure 2:
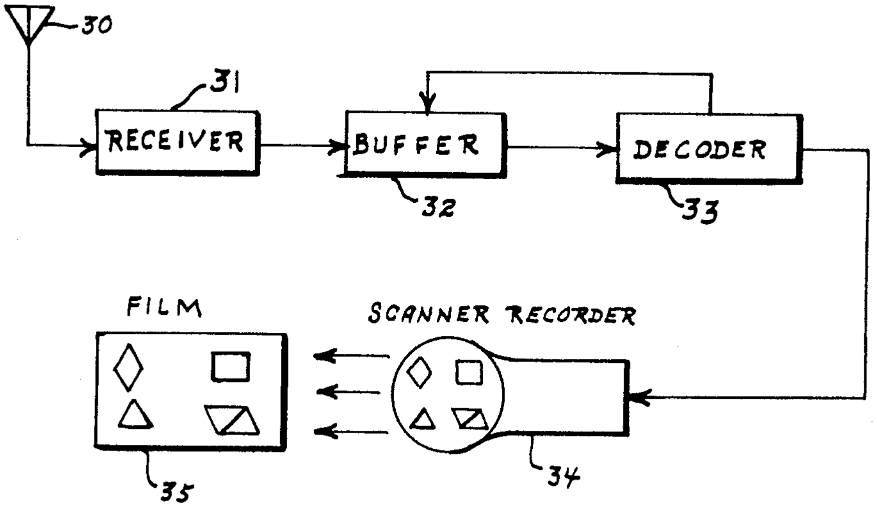
FIG. 2 is a block diagram of the receiver group in accordance with this invention.

There is shown in FIG. 2 the receiver group which receives the signal transmitted from the transmitter group. The signal is received at antenna 30 and applied to the receiver unit 31. The receiver 31 provides an output signal to buffer unit 32 for storage. The decoder unit 33 receives the output of the buffer unit 32 and provides a control signal to the buffer unit 32. The control signal provides control over the received signal in the buffer unit 32 by holding the signal in the buffer unit 32 by applying it to the decoder 33. The decoded signal from the decoder 33 is applied to a scanner-recorder device 34. The scanner-recorder device 34 provides a permanent visual record by exposing a film strip in accordance with the received data. The received data may also be applied to a cathode ray tube screen as temporary means of viewing if such is desired. The present invention comprises conventional devices which are arranged in a particular circuit configuration to produce the desired results. The circuits which are presented in FIGS. 1 and 2 in block diagram form are conventional circuits found in the following standard reference texts. The coder 19 and the decoder 33 are shown and described on reference page 10.16 of Digital Computer Technology and Design, written by Willis H. Ware and published by John Wiley and Sons. The comparator 18 is shown and described on page 203 of Digital Computer Principles by Wayne C. Irwin, published by D. Van Nostand Co. Inc. The memory-storage unit which is part of the comparator 18 is shown on page 114 of the same above reference test. The I/o buffer 20 and buffer 32 are described on pages 114–115 of Digital Computer Principles by Wayne C. Irwin. The digitizer 16 which may be an analog to digital converter is shown and described on page 742 of Digital Computer and Control Engineering, published by McGraw-Hill. The transmitter 21 receiver 31 are of the type shown and described on pages 397–398 of Radio Electronics, written by Samuel Seeley and published by McGraw-Hill. The scanner 10 and the Scanner Recorder 34 are shown and described on pages 18 through 32 of the reference text Computer Handbook, written by H. D. Hushey and Granino A. Korn and published by McGraw-Hill. The Manual Selector 17 is shown and described on pages 18 through 39 of the Computer Handbook by Hushey and Korn, and published by McGraw-Hill.

It may be noted that the operation in the receiver group is basically the reverse of the transmitter group. At the receiver, the non-redundant information is received, and again temporarily stored, for decoding. At this time, the information could be stored for a longer time such that either more redundant information could be added in the form of bits which, in effects, simulates the information which was deleted in the first place. When the image (in the case of pictorial data) is recorded, the recorder may either record nothing in the redundant areas, record just the code readout, or record the fictitious reference redundant information.

It is estimated that the repertoire of codes for redundant areas would be small to insure a small number of bits to be used for codes. Thus, if 16,000,000 bits are needed to digitize a frame of data, and the redundant information consists of 10,000,000 bits, the information to be transmitted would consist of only the 6,000,000 bits, plus the number of redundant areas which are insignificant in terms of bits of information. Thus approximately 60 percent of bandwidth of transmission time is saved by this principle.

It should be noted that the geometric figures on the film block 11 merely depict areas that are to be deleted and are not necessarily segments that have to be programmed for deletion in that manner. The deletion may be done by utilizing other approaches. For example, the segments can be a matrix of blocks which may then be addressed by $x$, $y$ coordinates, or a continuous line deletion could be utilized such that the areas are smooth in contour rather than square or in step form.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the he invention may be used to advantage without a corresponding use of other features.

I claim:

1. A redundant area coding system for selecting coding areas of a film according to useable information comprising in combination:

a scanner unit to scan said film and provide an output signal which is a representation of said film, a digitizer unit connected to said scanner unit, said digitizer unit receiving said scanner unit output signal, said digitizer unit providing a digital output signal, a memory and comparator unit to receive said digital output signal, said digital output signal being stored in said memory and comparator unit, a manual selector unit connected to said scanner unit to receive said output signal, said manual selector unit providing a first control signal to said digitizer unit, said manual selector unit providing a second control signal to said memory and comparator unit, a coder unit connected to said manual selector unit to receive a third control signal therefrom, said coder unit providing a coded signal to said memory and comparator unit in response to said third control signal, said memory and comparator unit forming a composite coded signal from said digital output signal and said coded signal, an input-output buffer unit connected to said memory and comparator unit to temporarily store said composite coded signal, a transmitter unit having an antenna, said antenna unit being connected to said input-output buffer unit to receive said composite coded signal, said composite coded signal being applied to said antenna for transmission, a receiver unit having an antenna, said receiver antenna receiving said transmitted composite coded signal, said composite coded signal being applied to said receiver to be amplified and detected by said receiver, said receiver providing a coded output signal, a buffer unit connected to said receiver to receive said coded output signal, said buffer unit storing said coded output signal, a decoder unit connected to said buffer unit to receive said coded signal, said decoder unit providing a control signal to said buffer unit, said coded output signal being decoded in said decoder unit in response to said control signal, said decoder unit providing a decoded output signal, and, a scanner-recorder unit connected to said decoder unit to receive said decoded output signal, said scanner-recorder unit being responsive to said decoded output signal, and providing a visual presentation of said decoded output signal.

* * * * *